US011882091B1

(12) United States Patent
Shah

(10) Patent No.: US 11,882,091 B1
(45) Date of Patent: Jan. 23, 2024

(54) ALLOCATION OF INTERNET PROTOCOL ADDRESSES BASED ON A LOCATION OF A VISITED NETWORK

(71) Applicant: T-Mobile USA, Inc., Bellevue, WA (US)

(72) Inventor: Mehul Shah, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/985,090

(22) Filed: Nov. 10, 2022

(51) Int. Cl.
*H04L 29/06* (2006.01)
*H04L 29/08* (2006.01)
*H04L 61/5007* (2022.01)
*H04L 69/16* (2022.01)

(52) U.S. Cl.
CPC ......... *H04L 61/5007* (2022.05); *H04L 69/16* (2013.01)

(58) Field of Classification Search
None
See application file for complete search history.

(56) References Cited

U.S. PATENT DOCUMENTS

| 6,804,720 | B1 | 10/2004 | Vilander et al. |
| 8,369,357 | B2 | 2/2013 | Tyer et al. |
| 2007/0097997 | A1* | 5/2007 | Maclean .............. H04L 61/106 370/401 |
| 2009/0286521 | A1* | 11/2009 | Buczek ................ H04L 61/30 455/433 |
| 2009/0286535 | A1* | 11/2009 | Buczek ................ H04W 48/18 455/433 |
| 2013/0094405 | A1* | 4/2013 | Vrbaski ................ H04W 4/00 370/259 |
| 2014/0115037 | A1* | 4/2014 | Liu ..................... H04L 65/1016 709/203 |
| 2015/0031356 | A1* | 1/2015 | Gupta ................... H04W 8/02 455/433 |
| 2016/0088459 | A1* | 3/2016 | Jiang .................. H04L 12/1407 455/406 |
| 2020/0154305 | A1* | 5/2020 | Link, II ................ H04M 15/83 |

FOREIGN PATENT DOCUMENTS

| CN | 100405781 C | 7/2008 |
| CN | 101511110 A | 8/2009 |
| CN | 101779496 A | 7/2010 |
| CN | 102106166 A | 6/2011 |
| CN | 101176332 B | 1/2012 |

(Continued)

*Primary Examiner* — Christopher B Robinson
(74) *Attorney, Agent, or Firm* — Perkins Coie LLP

(57) ABSTRACT

This document describes techniques, apparatuses, and systems for allocating internet protocol (IP) addresses for data sessions based on a location of a visited network. A home network can receive a request to establish a data session for a user equipment (UE) subscribed to the home network and located on a visited network operated by a visited network operator. The home network may identify a country in which the UE or the visited network is located and determine, based on a look-up table, a group of IP addresses associated with the country. The home network can allocate, from the group of IP addresses associated with the country, an IP address for the data session. In doing so, the IP address can be allocated based on the location of the visited network.

20 Claims, 5 Drawing Sheets

(56) References Cited

FOREIGN PATENT DOCUMENTS

| | | | |
|---|---|---|---|
| CN | 101449561 B | 7/2012 | |
| CN | 101406078 B | 9/2012 | |
| CN | 101406022 B | 12/2012 | |
| CN | 102907072 A | 1/2013 | |
| CN | 101730997 B | 6/2014 | |
| CN | 102843666 B | 4/2015 | |
| CN | 104038926 B | 9/2017 | |
| DE | 10143791 A1 | 4/2003 | |
| EP | 1111872 A2 | 6/2001 | |
| EP | 1610523 A2 | 12/2005 | |
| EP | 1486042 B1 | 7/2006 | |
| EP | 1730883 A2 | 12/2006 | |
| EP | 1198933 B1 | 1/2008 | |
| EP | 1429514 B1 | 2/2008 | |
| EP | 2009866 A1 | 12/2008 | |
| EP | 2174525 A2 | 4/2010 | |
| EP | 2179606 A2 | 4/2010 | |
| EP | 1493289 B1 | 6/2010 | |
| EP | 1974524 B1 | 11/2011 | |
| EP | 2464152 A2 | 6/2012 | |
| EP | 1974576 B1 | 12/2014 | |
| EP | 2958292 B1 | 4/2017 | |
| EP | 2171981 B1 | 8/2018 | |
| EP | 2519065 B1 | 8/2018 | |
| EP | 2979462 B1 | 5/2019 | |
| EP | 2583476 B1 | 9/2019 | |
| JP | 2001103574 A | 4/2001 | |
| JP | 4418136 B2 | 12/2009 | |
| JP | 4451568 B2 | 2/2010 | |
| JP | 4541568 B2 | 7/2010 | |
| JP | 2010535456 A | 11/2010 | |
| JP | 4639016 B2 | 12/2010 | |
| JP | 5319670 B2 | 7/2013 | |
| KR | 100625240 B1 | 9/2006 | |
| KR | 20100049625 A | 5/2010 | |
| WO | WO-2004100595 A1 * | 11/2004 | ............. H04W 8/18 |
| WO | 2006134313 A2 | 12/2006 | |
| WO | 2007006118 A1 | 1/2007 | |
| WO | 2007083091 A1 | 7/2007 | |
| WO | 2007083113 A1 | 7/2007 | |
| WO | 2009000886 A1 | 12/2008 | |
| WO | 2010121495 A1 | 10/2010 | |
| WO | 2011147264 A1 | 12/2011 | |
| WO | 2011157366 A1 | 12/2011 | |

\* cited by examiner

ALLOCATION OF INTERNET PROTOCOL ADDRESSES BASED ON A LOCATION OF A VISITED NETWORK

BACKGROUND

A mobile network operator (MNO) provides connectivity to subscribers of a home network within a coverage region that surrounds base stations provided by the MNO. To expand their coverage region beyond their own home network, the MNO may contract with another MNO to enable their subscribers to communicate using a visited network provided by the other MNO. In some cases, the visited network can route data sessions back to the home network such that the home network is responsible for allocating an Internet Protocol (IP) address for the data session. In doing so, a device can communicate on a visited network that is outside of a coverage region of the home network to which the device is subscribed.

BRIEF DESCRIPTION OF THE DRAWINGS

Detailed descriptions of implementations of the present invention will be described and explained through the use of the accompanying drawings.

Figure 1:
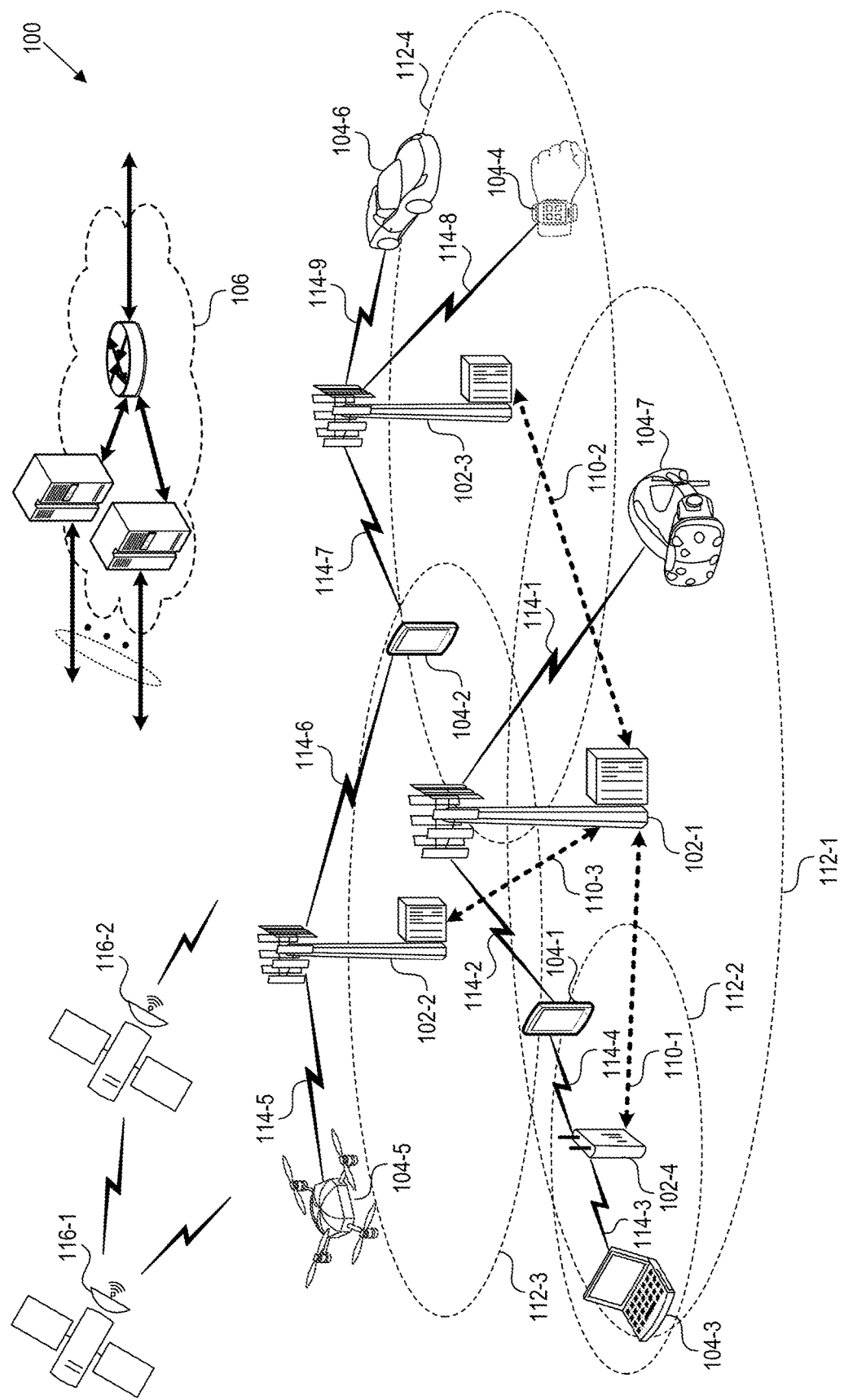
FIG. 1 illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology describes techniques, apparatuses, and systems that allocate IP addresses based on a location of a visited network. Network connectivity has been integrated in a number of devices to enable wireless communication through base stations connected to mobile networks that are operated by mobile network operators (MNOs). Each base station supports network connectivity within a surrounding coverage area, which, in combination with the other base stations, creates a coverage region within which a subscribed mobile device can connect to the mobile network. To increase the coverage region, MNOs may partner with other mobile network operators that operate mobile networks connected to base stations in regions outside of the coverage region supported by the MNOs' own base stations (e.g., in other countries) to enable mobile devices subscribed to their network to communicate through these base stations. As a result, a mobile device subscribed to the mobile network can roam on a visited network provided by a different mobile network operator to connect to a home mobile network to which they are subscribed.

One technique to enable roaming on a visited network is to route data traffic from a mobile device communicated on the visited network to a home network provided by the MNO to which the mobile device is subscribed (e.g., home routing). In doing so, the home network can control data paths and more effectively ensure their own standards of reliability and security for data transmitted to and from the mobile device. For example, the home network can allocate IP addresses to home-routed data sessions based on details associated with the home network instead of details associated with the mobile device or the visited network. Specifically, IP addresses may be assigned based on a location of a base station or server that receives/handles a session. Content providers (e.g., Google®, Spotify®, Netflix®, etc.) can utilize the IP address to determine characteristics about the data session that can be used to provide relevant content. For instance, an MNO may publish a geofeed that associates one or more IP addresses to a particular location. Based on the IP address of a data session, a content provider may determine the approximate location of the mobile device and provide relevant content for a user in that location. Thus, if a mobile device subscribed to a United States home network while roaming on a German network requests a connection to "Google," the mobile device may be served "http://www.google.de" instead of "http://www.google.com."

This problem is becoming increasingly prevalent due to the increase in single source solutions, where a single MNO is contracted to provide network connectivity to mobile devices that are used worldwide. Many manufacturers choose single source solutions due to the simplicity of reducing the need for interfaces between parts purchased from multiple sources. For example, if a single MNO is used to provide connectivity across all of the devices produced by a manufacturer, hardware, software, and firmware can be designed to specifically function with the hardware, software, or firmware provided by that single MNO. Automobile manufacturers are one example of a manufacturer that may utilize single source solutions where connectivity to vehicles sold in multiple countries is provided through a single United States-based MNO. A user of the vehicle sold outside the United States (e.g., Germany), however, can request content (e.g., music from Spotify®) to be provided over the mobile network. In a home-routed implementation as discussed above, the IP address of the data session may be based on a location of a home network entity that facilitates the data session. In the case of the user requesting music suggestions, the content that is provided, which is intended to be popular music in the user's area, may instead be popular music in the United States.

To solve these problems and others, the present technology describes allocating IP addresses based on a location of a visited network. When a request to initiate a data session is received over a visited network (e.g., to retrieve content from a content provider), the home network may identify the location (e.g., a Mobile Country Code (MCC)) of the mobile device, base station, or visited MNO that requests the data session. The home MNO may determine an IP address from a group of IP addresses associated with the location (e.g., country) to allocate for the data session, based on a look-up table that assigns IP addresses according to location. The IP address may be provided with the request for content to a content provider, and the content provider may determine where the requestor is located based on a geofeed published by the home MNO that associates IP addresses (e.g., groups of IP addresses) to respective countries. In doing so, the content provider may curate the requested content based on the location of the requester and provide the content back to the mobile device through the networks. For example, in response to a request for nearby restaurants initiated by a mobile device located in Germany but home-routed to a United States-based home network, the content provider may provide recommendations for restaurants in Germany instead of the United States.

In some implementations, the geofeed published by the home MNO may include locations that are not within a coverage area of any base stations associated with the home network. In some home-routed data sessions that do not base IP address allocation on the location of the visited network, MNOs may only publish geofeeds that include IP addresses associated with locations within the coverage area of the home network without roaming, as the home-routed data sessions are allocated IP addresses based on the location of the home network. To support the allocation of IP addresses based on the location of a data request on a visited network outside of a coverage area of any base stations associated with the home network, however, the geofeed may include IP addresses associated with locations only covered through roaming on visited networks.

In some implementations, the IP address may further be allocated based on the specific visited MNO that communicates the data session request. For example, the look-up table may associate locations and visited MNOs (e.g., mobile network codes (MNCs)) with a group of IP addresses. When a data session is requested from the location and using the visited MNO, the home network may allocate an IP address from that group for the data session. In some aspects, this can be used to ensure that the IP address allocated to the data session is supported by the visited MNO. For example, if the visited MNO supports Internet Protocol Version 4 (IPv4), the group of IP addresses may include addresses that comport with the IPv4 standard. Alternatively, or additionally, if the visited MNO supports Internet Protocol Version 6 (IPv6), the group of IP addresses may include addresses that comport with the IPv6 standard. In some cases, allocating IP addresses based on the visited MNO can enable the home MNO to support preferential relationships with some visited MNOs.

In some implementations, the IP address may only be allocated based on location of the visited network for a subset of international mobile subscriber identities (IMSIs) subscribed to the MNO. For example, the look-up table can include a set of IMSIs that are subscribed to the MNO and require localization treatment (e.g., IP addresses are allocated based on the visited network location). When a data session request is received from a visited network, the home network may determine if the IMSI of a mobile device requesting the data session is to receive localization treatment. If so, the IP address can be allocated based on the location of the mobile device or the visited network. If not, the IP address can be allocated based on the location of the home network. In aspects, this may enable the MNO to specify a subset of devices that will receive localization treatment. For example, the MNO may provide localization treatment to certain types of mobile devices (e.g., vehicles) or mobile devices sold in a country outside of the country in which the MNO is based. As a result, a mobile device that is rarely roaming (e.g., a mobile phone of a tourist based in the same country in which the MNO is based) may not be subject to the same localization treatment as a vehicle that is located in a country different from a country in which the MNO is based.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, IP connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different subcarrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultra-high definition content streaming among mobile devices, ARNR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

Home Routing

Figure 2:
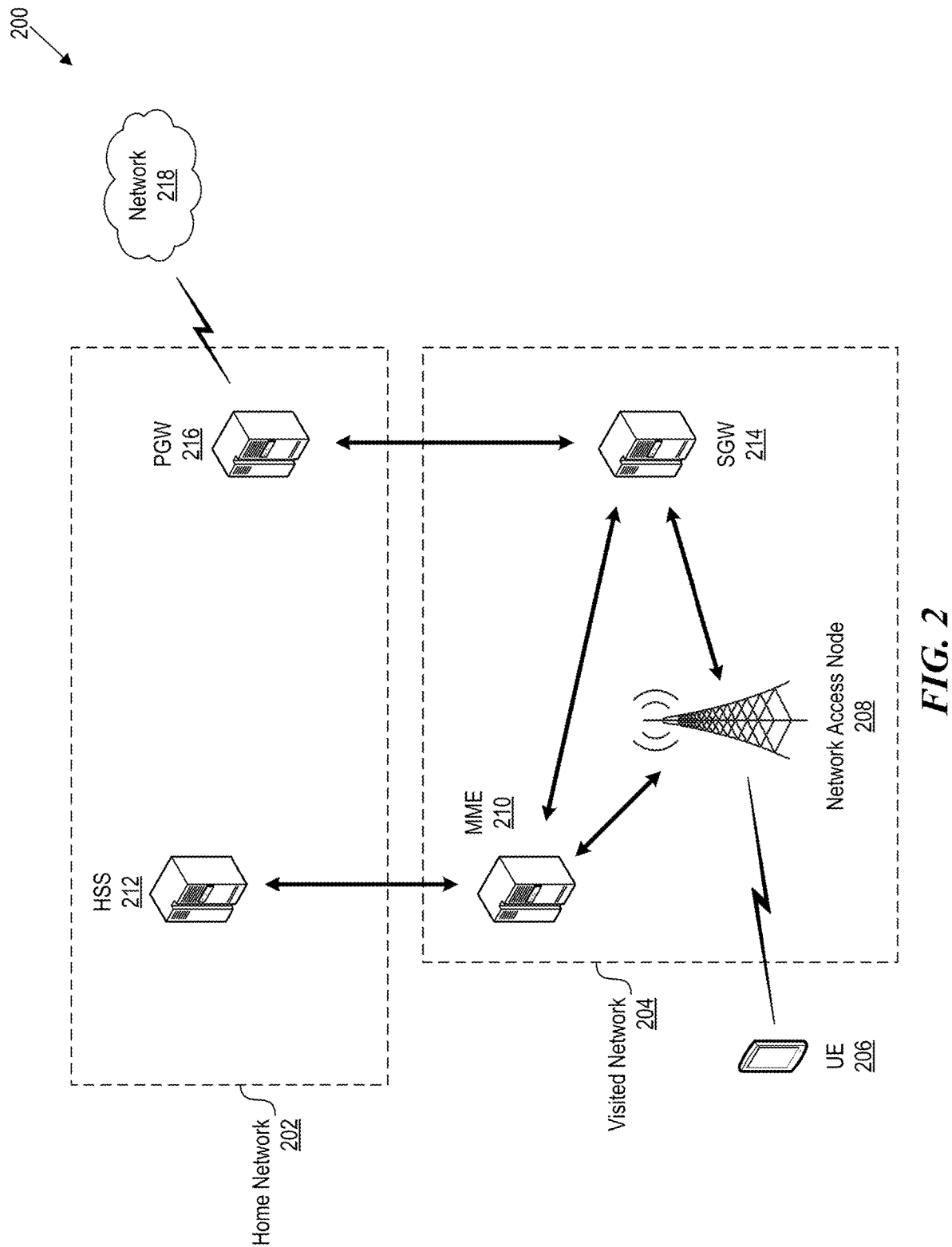
FIG. 2 illustrates a wireless communications system, including a home network and a visited network, that can implement aspects of the present technology.

FIG. 2 illustrates a wireless communications system 200, including a home network 202 and a visited network 204, that can implement aspects of the present technology. A UE 206 subscribed to the home network 202 is roaming on a visited network 204. The home network 202 can be partnered with the visited network 204 to enable subscribers of the home network 202 to communicate using the visited network 204. The UE 206 is located within a coverage region of a network access node 208 (e.g., base station) of the visited network 204. The UE 206 can be located outside of a coverage region of a network access node of the home network 202. Thus, the visited network 204 can be used to provide connectivity to the UE 206 at the current location. In aspects, data sessions (e.g., for access to the internet) initiated using the visited network 204 can be home-routed to the home network 202.

When the UE 206 initiates a data session request while located within a coverage region of the network access node 208, the network access node 208 can receive the request. The network access node 208 can request an authentication of the UE 206 from the home network 202. For example, the network access node 208 can transmit information about the UE 206 (e.g., an IMSI) to the Mobility Management Entity (MME 210) located within the visited network 204. The MME 210 can transmit the information about the UE 206 to a Home Subscriber Server (HSS 212), which authenticates the UE 206 as being subscribed to the home network 202 (e.g., or the home network operator) or permitted to roam on the visited network 204. Once authenticated, an authentication message can be received by the MME 210 to maintain the authentication of the UE 206. The MME 210 can provide an indication of the authentication to the Serving Gateway (SGW 214) at the visited network 204.

The data session request initiated by the UE 206 and received at the network access node 208 can be forwarded to the SGW 214. The SGW 214 can monitor network usage of the UE 206, for example, to bill the home network operator or the UE 206 for network usage by the UE 206. The SGW 214 can forward the data session request to a Packet Gateway (PGW 216) at the home network. The PGW 216 can be from a discrete set of PGWs allocated for roaming data sessions. In some cases, if the data session is determined to need localization treatment, the PGW 216 can be from a discrete set of PGWs allocated to localized data sessions.

The PGW 216 can receive the data session request initiated by the UE 206. The PGW 216 can track information related to network usage (e.g., visited network 204 usage or home network 202 usage), for example, to enable billing of the UE 206. The data session request can include information about the UE 206, the network access node 208, or the visited network 204. For example, the data session request may include the IMSI of the UE 206, the location of the UE 206 or the network access node 208, or the MNO of the visited network 204. The data session request can include a request for content from a content provider connected to a network 218. The PGW 216 can allocate an IP address to the data session based on the data session request. Given that the data session is home-routed to the home network 202, the PGW 216 can establish the data session in accordance with the security rules of the home network 202, and the sensitive information associated with the data session can be handled by the home network 202.

The PGW 216 can determine if the data session requires localization (e.g., based on the IMSI of the UE 206), and if so, the data session can be allocated an IP address based on a look-up table that associates the location of the UE 206 or the network access node 208 with a group of IP addresses. Without localization, however, the IP address can be allocated based on the location of the home network 202. For example, if the UE 206 or the network access node 208 is located in Germany and the home network 202 is based in the United States, a data session requiring localization may be assigned an IP address associated with Germany, and a data session that does not require localization may be assigned an IP address associated with the United States.

Once the PGW 216 allocates an IP address and establishes the data session, a data request associated with the data session may be routed across the network 218 to an entity that can provide the requested data. For example, if the data request is a request for content from a content provider, the data request can be routed to the content provider using the network 218. The content provider can compare the IP address allocated for the data session to a geofeed published by the home network operator, which associates groups of IP addresses with locations in which the request is initiated. In a non-localized data session, the IP address can correspond to an IP address that is associated with the location of the home network 202 in the geofeed. In a localized data session, however, the IP addresses can correspond to an IP address that is associated with the location of the UE 206 or the visited network 204 in the geofeed.

Based on the IP address and the geofeed, the content provider can curate content requested by the UE 206. For example, the UE 206 may request music suggestions for their area, and the content provider can provide music suggestions based on popular music from other users in the area associated, in the geofeed, with the IP address allocated to the data session. Thus, in localized data sessions, the content can be curated based on the location of the UE 206 or the visited network 204, and in non-localized data sessions, the content can be curated based on the location of the home network 202. The content can be provided from the content provider to the PGW 216 through the network 218. The PGW 216 may provide the content to the SGW 214, and the SGW 214 may transmit the content to the network access node 208, which provides the content to the UE 206.

Localization Treatment

In contrast to other home-routed roaming architectures, aspects of the present technology enable IP addresses to be allocated for data sessions based on the location of a visited network on which a UE that initiates a request for the data session is roaming. The IP address can be allocated based on a look-up table that associates groups of IP addresses with characteristics of a data session request initiated by a UE roaming on a visited network. The look-up table may correspond to a geofeed published by the home network operator to enable content providers to determine the location associated with a data session. Configuring a look-up table and a geofeed to enable localization treatment in accordance with one or more aspects of the present technology is described in greater detail with respect to FIG. 3.

Figure 3:
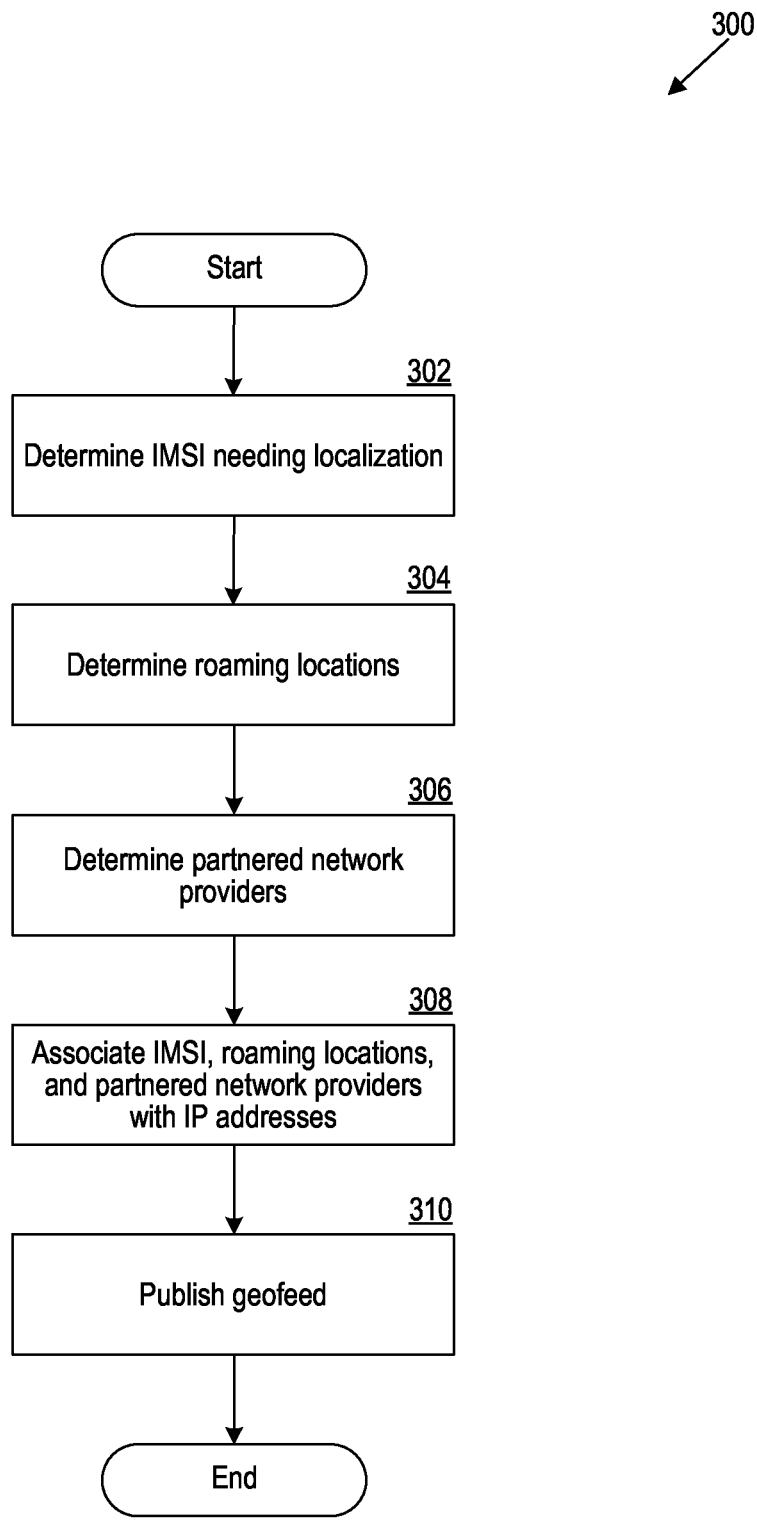
FIG. 3 illustrates an example method in accordance with aspects of the present technology.

FIG. 3 illustrates an example method 300 in accordance with aspects of the present technology. At 302, the home network operator can determine which IMSIs subscribed to the home network will receive localization treatment. For instance, a data session request initiated by a UE associated with an IMSI that is configured to receive the localization treatment can have an IP address allocated based on the location of the UE or the visited network. Given that the home network operator can determine a subset (e.g., proper subset) of IMSIs that are configured to receive the localization treatment, the home network operator can configure only a portion of the IMSIs to receive the localization treatment. In some cases, the IMSIs may be configured to receive localization treatment based on device type. In doing so, the mobile network operator can configure devices to receive localization treatment if they are likely to be roaming often; however, devices that may temporarily roam on a visited network can be configured not to receive the localization treatment. For example, the localization treatment can be implemented in vehicles that are configured to operate in a country that is different from the country in which the home network is based and are thus likely to be roaming often. In contrast, a mobile device configured to be operated in a same country as the country in which the home network is based may not be configured to receive the localization treatment.

At 304, the home network operator can determine locations in which the localization treatment can be supported. For example, the home network can determine the locations that are within a coverage area of visited networks partnered with the home network. The locations in which localization treatment can be supported can include locations that are not within a coverage region of the home network. In aspects, the locations may include a city, state, or country in which localization treatment is supported.

At 306, the home network operator can determine all of the partnered visited network operators that provide roaming services for subscribers of the home network. The home network operator can determine details of each of the visited network operators, for example, coverage locations, network specifications, or details relating to the roaming agreement between the home network operator and the visited network operators. In some implementations, the home network operator can determine which IP standards are supported by the visited network so that IP addresses that comport to a supported IP standard can be allocated to data sessions originating from the visited network. In some cases, the home network operator can determine if the visited network is subject to preferential treatment based on the roaming agreement between the home network operator and the visited network. For example, a data session initiated using a first visited network can be handled prior to a data session initiated using a second visited network based on the first visited network being subject to preferential treatment. In aspects, the home network operator can determine data limits or speeds supported by the visited network based on the roaming agreement.

At 308, the IMSIs, the locations, and the visited networks can be associated with groups of IP addresses in a look-up table. For example, the look-up table can specify the IMSIs that are subject to the localization treatment. The look-up table can include locations at which a subscriber to the home network can roam on a visited network. In some cases, the look-up table can include the MCCs for various countries in which roaming is supported by the home network. The look-up table can include a group of IP addresses associated with each of the locations (e.g., the MCCs). In some cases, the groups of IP addresses can further be associated with a visited network (e.g., the MNC) from which the data session was initiated. The group of IP addresses associated with a visited network in the look-up table may comport with an IP standard supported by the visited network. An example of a look-up table in accordance with aspects of the present technology is shown below.

| Home Network IMSI Assigned to UE | Visited Network Location (MCC) | Visited Network Operator (MNC) | IP address pool |
| --- | --- | --- | --- |
| 311882100 000000 to 311882100 999999 | Germany (262) | T-Mobile Germany (01) | 2607:fb90:2900::/44 |
|  |  | Vodafone Germany (02) | 2607:fb90:c13e:b::/64 |
|  | Italy (222) | Any (all operators) | 2607:fb90:c13f:fffd::/64 |
| All other IMSI |  |  | Default IP address pools |

As illustrated in the look-up table above, the IMSIs that range between 311882100 000000 and 311882100 999999 are subjected to localization treatment. In the above example, all other IMSIs are not subjected to localization treatment, and thus, data sessions imitated by UEs having these IMSIs can be allocated IP addresses based on the location of the home network. If the IMSI is within the group of IMSIs that are subject to localization treatment, the location of the UE or the visited network is determined. For example, the UE or visited network location can be determined as Germany or Italy. In some instances, the location of the UE or the visited network can be determined from the MCC. For instance, Germany has MCC 262 and Italy has MCC 222.

In the look-up table above, data sessions originating from Germany are further associated with IP addresses based on the visited network operator providing the visited network. In some cases, the visited network operator can be determined from the MNC. For instance, T-Mobile Germany has the MNC 01 and Vodafone Germany has the MNC 02. Groups of IP addresses are then assigned to T-Mobile Germany (e.g., 2607:fb90:2900::/44) and Vodafone Germany (e.g., 2607:fb90:c13e:b::/64). In some cases, the groups of IP addresses associated with the visited network operator can comport to an IP standard supported by the network operator. For example, T-Mobile Germany could support IPv6, and Vodafone could support IPv4. Thus, the IP addresses associated with T-Mobile Germany can comport to the IPv6 standard, and the IP addresses associated with Vodaphone Germany can comport to the IPv4 standard. As illustrated in the above look-up table, Italy is not further divided based on network operator. Thus, a data session originating from a UE having an IMSI needing localization treatment and located in Italy will be allocated an IP address from a same group of IP addresses (e.g., 2607:fb90:c13f:fffd::/64).

At 310, a geofeed is published by the home network operator. In aspects, the geofeed can correspond to the look-up table that is used to allocated IP addresses for data sessions. For example, the geofeed can associate a group of IP addresses with a same location as the look-up table. In this way, a content provider that retrieves the geofeed can determine the location associated with a data session based on the IP address. In some cases when localization treatment is not used, a mobile network operator may only publish a geofeed that associates IP addresses with locations covered by the home network. For example, if all home-routed data sessions are allocated IP addresses based on the home network, the home network operator may not publish a geofeed that includes IP addresses associated with locations that are not covered by the home network. In accordance with the present technology, however, the home network operator can publish a geofeed that includes groups of IP addresses associated with location that are not covered by the home network, given that a data session may be allocated an IP address based on the location of a UE or visited network that is outside of a coverage region of the home network. Allocating IP using localization treatment is described in greater detail with respect to FIG. 4.

Figure 4:
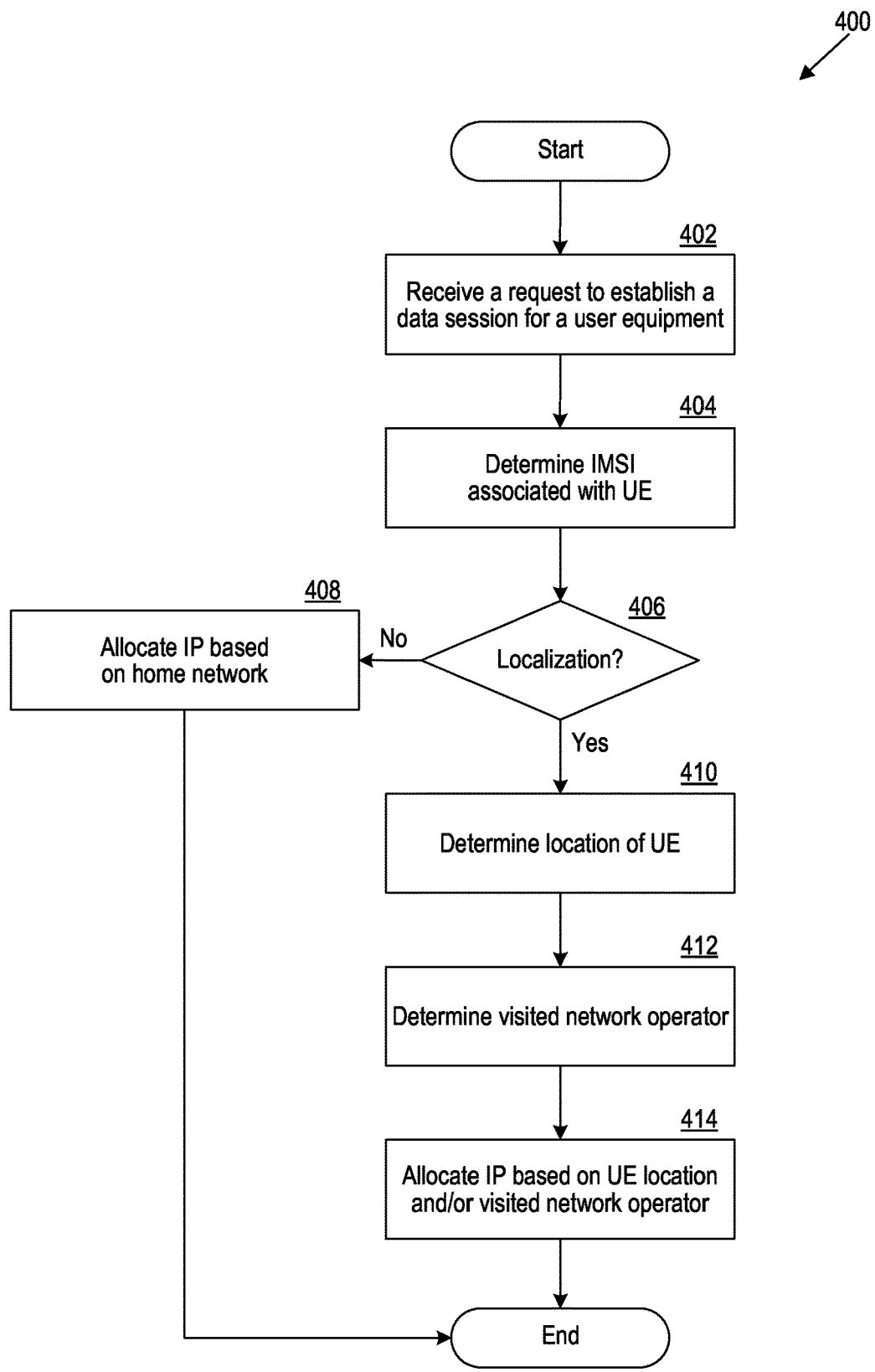
FIG. 4 illustrates an example method in accordance with aspects of the present technology.

FIG. 4 illustrates an example method 400 in accordance with aspects of the present technology. At 402, the PGW can receive a request to establish a data session for a UE. The request can be received from the UE through the network access node and the SGW of the visited network. The data session request can include information relating to the UE, the visited network, or the specific data requested. The PGW can be a specific set of gateways intended for localized data sessions or for home-routed data sessions. At 404, the PGW can determine the IMSI associated with the UE that initiates the data session request. The IMSI can be included within the data session request. At 406, the PGW can determine if localization treatment is to be performed for the requested data session. For example, the PGW can compare the IMSI associated with the UE that initiates the data session with a set of IMSIs that are determined to undergo the localization treatment. The set of IMSIs can be included in the look-up table, and the IMSI associated with the UE can be compared to the look-up table.

If the PGW determines that localization is not to be performed for the data session (e.g., based on the IMSI being absent from the set of IMSIs), an IP address can be allocated based on the home network location at 408. The IP allocation without localization treatment can be similar to other home-routed architectures. For example, the data session can be initiated by a UE or a visited network that is located in a different country from the country in which the home network is based. When the home network receives the data session request, the PGW may allocate an IP address for the data session based on the location of the home network. As a result, a content provider can curate content based on the location of the home network instead of the location of the UE or visited network. For instance, if a UE located in Germany and subscribed to a United States-based home network requests "Google," the UE is served "http://www.google.com" instead of "http://www.google.de."

If the PGW determines that localization is to be performed for the data session (e.g., based on the IMSI being present in the set of IMSIs), the PGW can determine the location of the UE or the visited network at 410. The location of the UE or the visited network can be included within the data session request. For example, the MCC can be included in the data session request. At 412, the PGW can determine the identity of the visited network operator. For example, the PGW can determine that the visited network through which the data session is initiated is provided by a particular visited network operator (e.g., based on the MNC). At 414, the PGW can allocate an IP address for the data session based on the UE or visited network location or the identity of the visited network operator. The PGW can compare the data session request to the look-up table to determine a group of IP addresses that are associated with the UE or visited network location. In some cases when the groups of IP addresses are further associated with the visited network operators, the PGW can determine a group of IP addresses that is associated with the location of the UE or the visited network and the visited network operator. The PGW can choose an IP address from the group of IP addresses associated with the location of the UE or the visited network or the identity of the visited network operator. The IP address can correspond to an IP address associated with the location of the UE or the visited network in the published geofeed. In this way, a content provider can determine the location associated with a data session and curate content based on the location. The curated content can be routed back to the UE through the home network and the visited network.

Computer System

Figure 5:
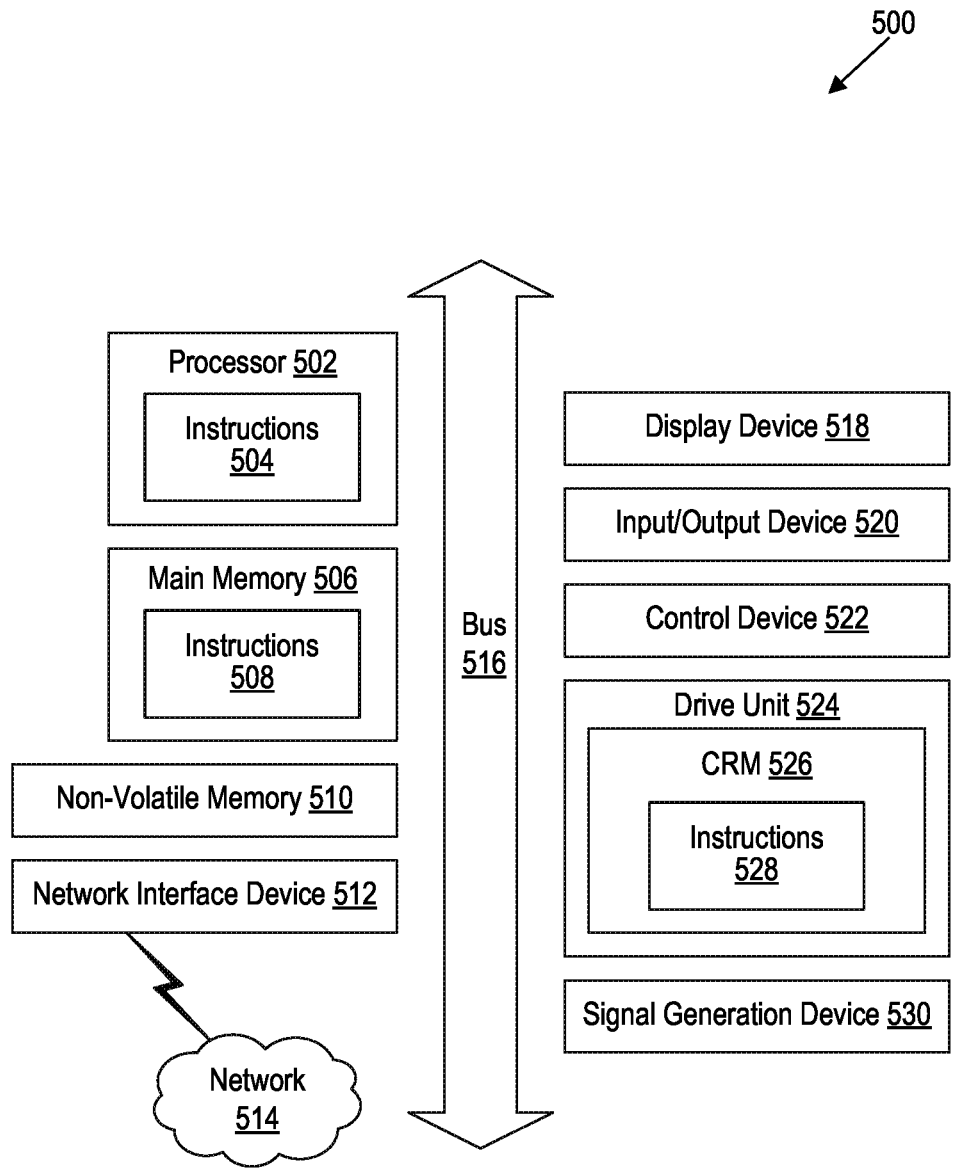
FIG. 5 illustrates an example computer system in which at least some aspects of the present technology can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, which stores instructions 528 to be executed by the one or more processors 502, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC) or a distributed system, such as a mesh of computer systems, or include one or more cloud components in one or more networks. Where appropriate, one or more computer systems 500 can perform operations in real time, near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, and 528) set at various times in various memory and storage devices in computing device(s). When read and executed by the processor 502, the instruction(s) cause the computing system 500 to perform operations to execute elements involving the various aspects of the disclosure.

REMARKS

The terms "example", "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described that can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; and the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. At least one non-transitory computer-readable storage medium storing instructions, which, when executed by at least one data processor of a system, cause the system to:
   receive, at a home mobile network of a user equipment, a request to establish a data session for the user equipment,
      wherein the request indicates that the user equipment is located in a first country on a visited network operated by a first mobile network operator,
      wherein the data session is associated by default with an internet protocol (IP) address that designates a second country of the home mobile network, and
      wherein the home mobile network is operated by a second mobile network operator different from the first mobile network operator and the first country is different from the second country;
   identify, based on the request to establish the data session, the first country in which the user equipment or the visited network is currently located;
   determine, based on a look-up table, a group of IP addresses associated with the first country,
      wherein the look-up table associates groups of IP addresses per Mobile Country Codes (MCCs) of respective countries; and
   allocate, by the home mobile network and from the group of IP addresses associated with the first country, a particular IP address in lieu of the default IP address for the data session of the user equipment.

2. The at least one non-transitory computer-readable storage medium of claim 1, wherein the particular IP address for the data session of the user equipment is allocated responsive to the system being caused to:
   identify an international mobile subscriber identity (IMSI) associated with the user equipment; and
   determine that the IMSI associated with the user equipment is included in a set of IMSIs that are subscribed to the home mobile network and that require localized data sessions.

3. The at least one non-transitory computer-readable storage medium of claim 1, wherein the particular IP address for the data session of the user equipment is allocated responsive to the system being caused to:
   determine an international mobile subscriber identity (IMSI) associated with the user equipment; and
   determine that the IMSI associated with the user equipment included in a set of IMSIs comprising a plurality of IMSIs associated with a particular type of device.

4. The at least one non-transitory computer-readable storage medium of claim 1, wherein the system is further caused to:
   receive, at the home mobile network of the user equipment, a request to establish an additional data session for an additional user equipment that is on an additional visited network operated by a third mobile network operator,
      wherein the additional user equipment has a same home mobile network as the user equipment;
   identify an additional IMSI associated with the additional user equipment;
   determine that the additional IMSI associated with the additional user equipment is absent from a set of IMSIs that are subscribed to the home mobile network and that require localized data sessions; and
   responsive to the determination that the additional IMSI associated with the additional user equipment is absent from the set of IMSIs, allocate an additional IP address for the additional data session of the additional user equipment based at least on the second country of the home mobile network of the user equipment.

5. The at least one non-transitory computer-readable storage medium of claim 1, wherein the system is further caused to:
   identify the first mobile network operator that provides the visited network,
      wherein the group of IP addresses are further associated with the first mobile network operator.

6. The at least one non-transitory computer-readable storage medium of claim 1, wherein the system is further caused to:
   identify the first mobile network operator that provides the visited network,
      wherein the group of IP addresses comport to an IP version that is supported by the visited network.

7. The at least one non-transitory computer-readable storage medium of claim 1, wherein the system is further caused to:
   route, from the user equipment, a request for content from a content provider based on the data session for the user equipment,
      wherein the content is curated based on the particular IP address associated with the first country; and
   route the curated content from the content provider toward the user equipment.

8. The at least one non-transitory computer-readable storage medium of claim 1, wherein the user equipment is comprised in a vehicle configured to operate in the first country.

9. A system comprising:
   at least one hardware processor; and
   at least one non-transitory memory storing instructions, which, when executed by the at least one hardware processor, cause the system to:
      receive, at a home mobile network of a user equipment, a request to establish a data session for the user equipment,
         wherein the request indicates that the user equipment is located in a first country on a visited network operated by a first mobile network operator, and
         wherein the home mobile network is operated by a second mobile network operator different from the first mobile network operator;
      identify, based on the request to establish the data session, the first country in which the user equipment is currently located;
      determine, based on a look-up table, a group of IP addresses associated with the first country,
         wherein the look-up table associates groups of internet protocol (IP) addresses with respective countries; and
      allocate, by the home mobile network and from the group of IP addresses associated with the first country, a particular IP address for the data session of the user equipment.

10. The system of claim 9, wherein the particular IP address is allocated for the data session of the user equipment responsive to the system being caused to:
    determine an international mobile subscriber identity (IMSI) associated with the user equipment; and determine that the IMSI associated with the user equipment is included in a set of IMSIs that are subscribed to the home mobile network and that require localized data sessions.

11. The system of claim 9, wherein the particular IP address is allocated for the data session of the user equipment responsive to the system being caused to:
   determine an international mobile subscriber identity (IMSI) associated with the user equipment; and
   determine that the IMSI associated with the user equipment is included in a set of IMSIs comprising a plurality of IMSIs associated with a particular device type.

12. The system of claim 9, wherein the system is further caused to:
   receive, at the home mobile network of the user equipment, a request to establish an additional data session for an additional user equipment that is on an additional visited network provided by a third mobile network operator,
      wherein the additional user equipment has a same home mobile network as the user equipment;
   determine an international mobile subscriber identity (IMSI) associated with the additional user equipment;
   determine that the IMSI associated with the additional user equipment is absent from a set of IMSIs that are subscribed to the home mobile network and that require localized data sessions; and
   responsive to the determination that the IMSI associated with the additional user equipment is absent from the set of IMSIs, allocate, by the home mobile network, an additional IP address to the additional user equipment based at least on the second country of the home network of the user equipment.

13. The system of claim 9, wherein the system is further caused to:
   identify the first mobile network operator that provides the visited network,
      wherein the group of IP addresses are further associated with the first mobile network operator.

14. The system of claim 9, wherein the system is further caused to:
   identify the first mobile network operator that provides the visited network,
   wherein the group of IP addresses comport to an IP version that is supported by the visited network.

15. The system of claim 9, wherein the system is further caused to:
   route, from the user equipment, a request for content from a content provider based on the data session for the user equipment,
      wherein the content is curated based on the particular IP address associated with the first country; and
   route the curated content from the content provider toward the user equipment.

16. The system of claim 9, wherein the user equipment comprises a vehicle configured to operate in the first country.

17. A system comprising:
   at least one hardware processor; and
   at least one non-transitory memory storing instructions, which, when executed by the at least one hardware processor, cause the system to:
      create a geofeed associated with a first mobile network operator,
         wherein the geofeed associates a group of internet protocol (IP) addresses with a first location outside of a coverage region of a first network operated by the first mobile network operator, and
         wherein the first mobile network operator supports wireless communication at the first location through roaming on a second network operated by a second mobile network operator;
      receive, at the first network, a request to establish a data session for a user equipment subscribed to the first network,
         wherein the user equipment is located at the first location on the second network;
      determine, based on the request to establish the data session, that the user equipment is located at the first location; and
      allocate, by the first network for the data session of the user equipment, a particular IP address of the group of IP addresses based on the user equipment being located at the first location.

18. The system of claim 17, wherein allocating the particular IP address for the data session of the user equipment is responsive to the system being caused to:
   determine an international mobile subscriber identity (IMSI) associated with the user equipment; and
   determine that the IMSI associated with the user equipment is included in a set of IMSIs that are subscribed to the first network and that require localized data session.

19. The system of claim 17, wherein the system is further caused to:
   identify the second mobile network operator that operates the second network,
      wherein the first group of IP addresses is further associated with the second mobile network operator, and
      wherein allocating, for the data session of the user equipment, the particular IP address of the group of IP addresses is further based on the user equipment being on the second mobile network operated by the second mobile network operator.

20. The system of claim 17, wherein the system is further caused to:
   route, from the user equipment, a request for content from a content provider based on the data session for the user equipment,
      wherein the content is curated based on the particular IP address associated with the first location; and
   route the curated content from the content provider toward the user equipment.

* * * * *